United States Patent [19]
Geisthoff

[11] 3,845,845
[45] Nov. 5, 1974

[54] WHEEL CHOCK FOR VEHICLES
[75] Inventor: Hubert Geisthoff, Lohmar, Germany
[73] Assignee: Jean Walterscheid GmbH,
Lohmar/Rheinland, Germany
[22] Filed: Oct. 5, 1973
[21] Appl. No.: 403,892

[30] Foreign Application Priority Data
Oct. 7, 1972   Germany.............................. 2249211

[52] U.S. Cl. ............................................... 188/32
[51] Int. Cl. ............................................... B60t 3/00
[58] Field of Search........................ 188/4 R, 32, 36

[56] References Cited
UNITED STATES PATENTS
3,724,241    5/1973    Hale.................................... 188/32

*Primary Examiner*—Duane A. Reger
*Attorney, Agent, or Firm*—Edmund M. Jaskiewicz

[57] ABSTRACT

A wheel chock comprises a base plate which is pivotally connected by a plurality of mutually crossing struts to a chock plate. The chock plate is pivotable from an aligned coplanar relationship with the base plate in the assembled position to an operative position wherein the chock plate is positioned above the base plate and engaging the periphery of a vehicle wheel.

9 Claims, 4 Drawing Figures

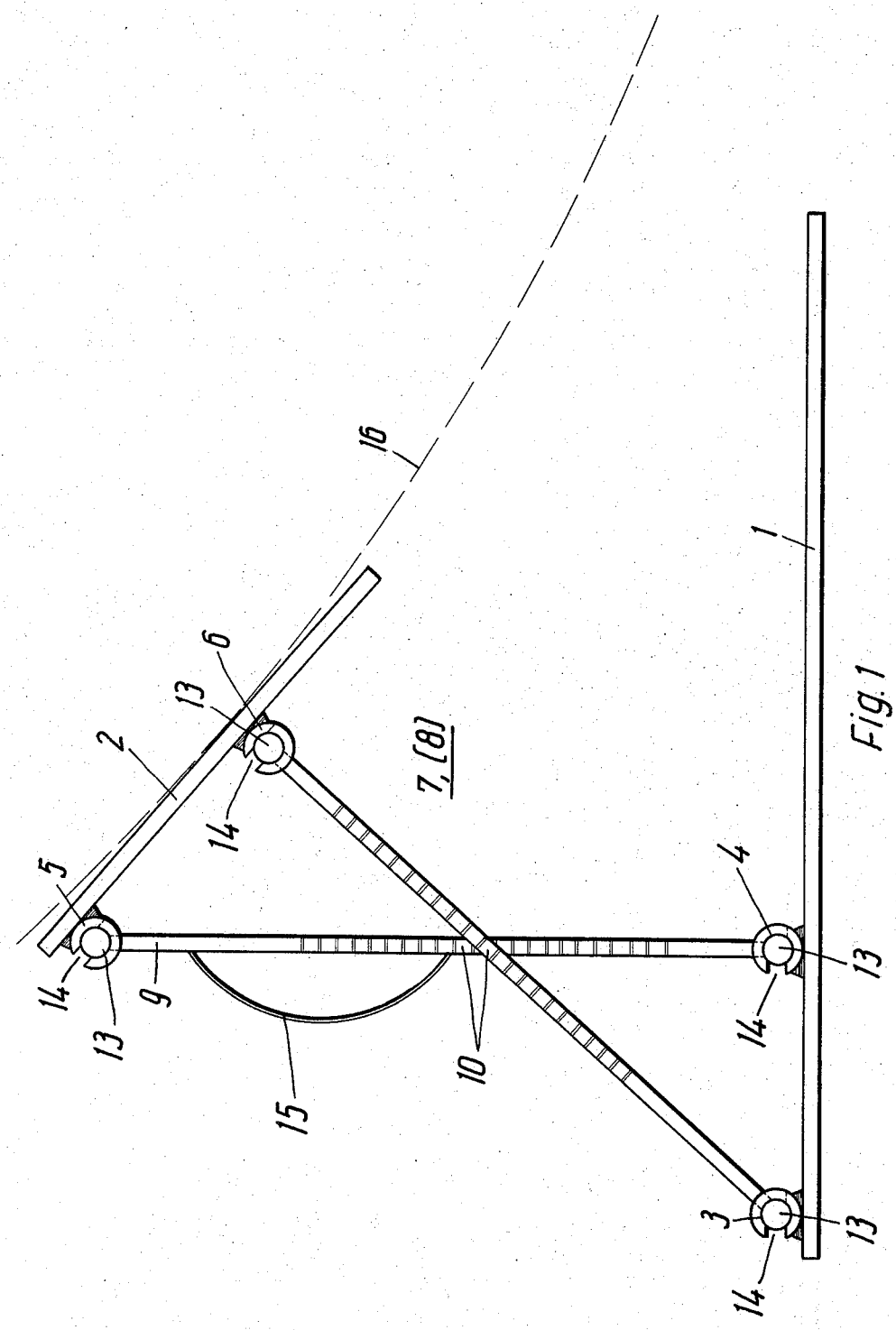

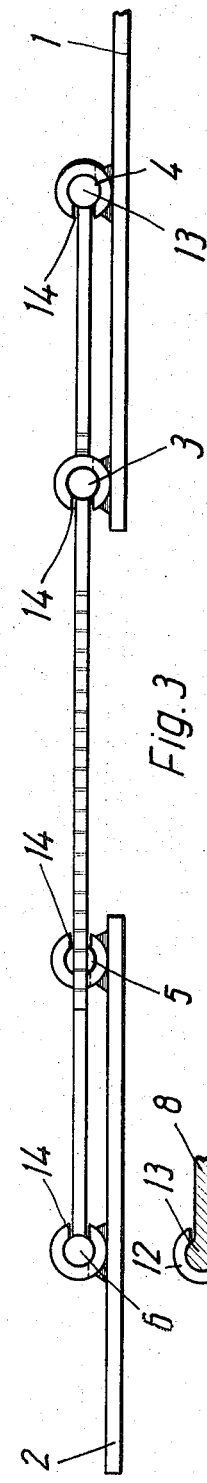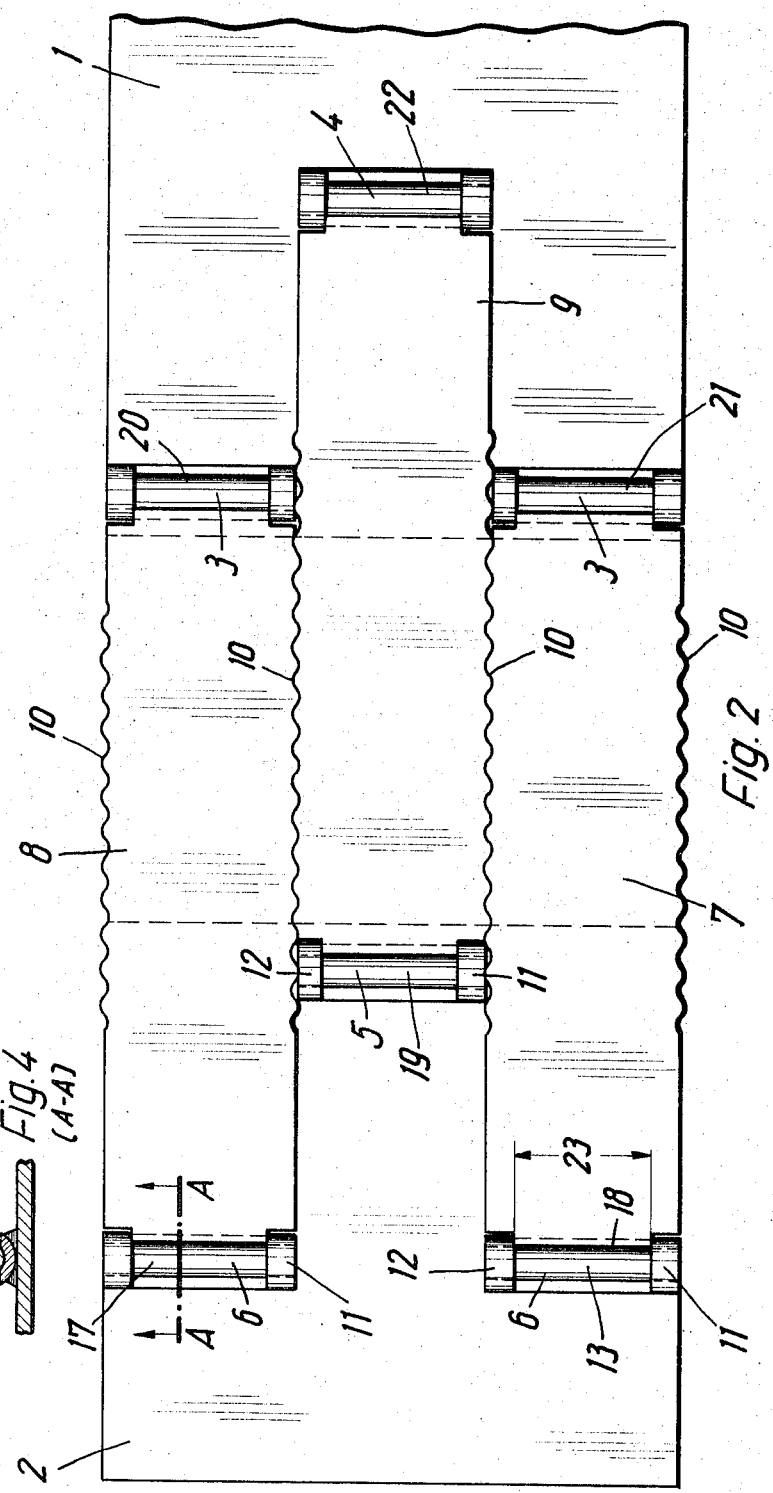

WHEEL CHOCK FOR VEHICLES

The present invention relates to a braking wedge or wheel chock for vehicles, more particularly, to such a wheel chock comprising pivotally interconnected base and chock plates.

Wheel chocks which are in present use of the type generally carried by trucks, buses and other vehicles are usually constructed for application to wheels of a particular diameter. The chock plate or blocking surface of such a chock is adapted to engage the outer periphery of the wheel and generally has a radius of curvature substantially equal to the radius of the wheel. An obvious disadvantage of such a wheel chock is that it is limited for use with particular size wheels and occupies a relatively large space. This disadvantage becomes more apparent when a vehicle has wheels of different diameters such as is the case with an agricultural tractor. For such a vehicle two different wheel chocks must be carried in order to perform properly the blocking function with the respective wheels.

It is the principal object of the present invention to provide a novel and improved wheel chock which is readily adaptable to different sizes of wheels and will occupy a minimum of space when not in use.

It it another object of the present invention to provide such a wheel chock that is simple to manufacture and comprises a minimum of components which may be readily assembled by a simple operation.

According to one aspect of the present invention a wheel chock for vehicles may comprise a base plate and a wheel supporting chock plate each having first and second pivot joints thereon with these joints being equally spaced behind each other transversely of the pivot axis. A plurality of mutually crossing struts pivotally connect corresponding pivot joints on the base and chock plates such that the chock plate is pivoted from an assembled position in the same plane as the base plate to a position above the base plate where it engages the periphery of a vehicle wheel. The struts are positioned closely adjacent to each other and can be locked into different positions by virtue of their particular configuration along the edges or by frictional engagement. The locking of the struts will provide different positions of the chock plate relative to the base plate.

Other objects and advantages of the present invention will be apparent from the accompanying description when taken in conjunction with the following drawings, which are exemplary, wherein;

FIG. 1 is a side elevational view of the wheel chock according to the present invention fully extended for service;

FIG. 2 is a top plan view of the wheel chock in its assembled position;

FIG. 3 is a side elevational view of the chock in assembled position as shown in FIG. 2; and FIG. 4 is a sectional view taken along the line A—A of FIG. 2.

Proceeding next to the drawings wherein like reference symbols indicate the same parts throughout the various views a specific embodiment of the present invention will be described in detail.

The wheel chock or brake wedge comprises a base plate 1, a wheel supporting chock plate 2, strut members 7, 8 and 9, and the joints or hinges 3, 4, 5 and 6, whereby the struts 7, 8, and 9 are pivotally connected to the base plate 1 and to the chock plate 2.

The base plate 1 comprises a pivot point 3 which, when the wheel chock is in service or operating position (FIG. 1) is remote from the adjacent vehicle wheel 16.

This pivot point 3 comprises two laterally spaced hinge joints 20, 21. A further pivot point 4 is also on the base plate 1, parallel with, but spaced away in the direction towards the wheel from, the pivot point 3. This further pivot point 4, however, only comprises a single hinge joint 22. The chock plate 2 similarly has two pivot points 5 and 6 so positioned that the struts 7, 8 and 9 which are mounted in pivot points 3 and 4 of the base plate 1 will mutually cross or intersect.

Thus, the pivot point 5 of the chock plate 2 comprises a hinge joint 19 and the articulation point 6 of the chock plate 2 comprises two hinge joints 17, 18 corresponding to the hinge joint 20, 21. The construction details of the hinge joints 17 to 22 are described with reference to the joint 18 and all of the hinge joints 17 to 22 are identical.

The hinge joint 18 comprises a tubular hinge housing 11, 12 formed, for example, from a length of tubing, and having an opening or slot 23 which extends over a portion of the axial length thereof and over more than 180° of its circumference (see also FIG. 4).

Two housing portions 11 and 12 are thus provided each having an axial slit 14. The slits 14 extend approximately parallel with the surface of the base plate 1 or chock plate 2 and their width corresponds approximately to the thickness of the struts 7, 8, and 9. The housings 11, 12 are preferably integral with the base plate 1 and chock plate 2.

The struts 7, 8 and 9 have on their ends hinge pins 13 extending at right angles to their longitudinal axis and either formed integrally therewith or secured thereto, e.g., by welding. The length of the hinge pins corresponds approximately to the length of the associated housings 11, 12. Furthermore, the width of the struts 7, 8 and 9 in the region of their hinge pins 13 is approximately equal to the length of the opening 23 in the hinge housing 11, 12. The hinge joints 17 to 22 are arranged such that the slits 14 in the housings 11, 12 of base plate 1 and chock plate 2 will face one another in the assembly position. In the assembly position (FIGS. 2 and 3) the base plate 1 and chock plate 2 are mutually parallel and aligned one behind the other. The assembly of the chock therefore involves the successive operations of successively sliding the struts 9, 8, 7 and thus their associated hinge pins 13 laterally into the housings 11, 12. Each strut itself will be moved through the slit 14 until the opening 23 and that part of the strut corresponding with the opening coincide in their position. When the chock plate 2 is swung upwardly from this position the chock assembly will be securely locked together because the strut members 7, 8 and 9 are guided between the hinge housing portions 11 and 12.

The struts 7 and 8 are mounted mutually parallel and laterally spaced apart in hinge bearings 18, 21 and 17, 20 at the pivot point remote from the wheel to be supported and the strut 9 connected to the pivot point of the base plate which faces the wheel is mounted, also in a hinge bearing 19, 22 between said pair of struts. The two struts 7, 8 which are associated with the pivot point remote from the wheel to be supported have the extension of their longitudinal axis directed in the direction towards the wheel center. A pair of strut members is here provided because the main service load is transmitted from the adjacent wheel to this region, and more specifically, as a thrust force, while the strut situated therebetween serves primarily to stabilize the system in service position.

The mutually facing lateral edges 10 of the struts 7, 8 and 9 have an undulating conformation over a portion of their lengths such that the peaks and valleys of the undulations in a pair of adjacent strut members interengage to secure the chock plate 2 in specific predetermined positions relative to the base plate 1. All strut members 7, 8, 9 are of identical design construction and have the undulating configuration along both lateral edges so that if one side has been worn, the relative positions of the struts may be changed or the struts turned over.

When the chock is not in service the chock plate 2 is collapsed until base plate 1 and chock plate 2 are parallel, one on top of the other. In this position the wheel chock may be readily stowed away, for example in a pocket or recess provided on the vehicle.

Each hinge joint comprises a tubular housing 11, 12 having an aperture 23 in its central portion which extends over a portion of its axial length. The hinge pin 13 adapted to be slidingly inserted in said housing is secured to the ends of the associated strut member at right angles to the longitudinal axis thereof. The width of each strut member in the region of its hinge pin corresponds substantially to the length of the aperture with the hinge pin projecting beyond the latter on both sides. Alternatively, the hinge bearing or joint may only comprise a pair of spaced apart tubular parts secured to the base or chock plate. Furthermore, hinge pins are secured to the ends of the strut members at right angles to the longitudinal axis thereof which pins are adapted to be slidingly engaged within said tubular members. The hinge pins can also be formed integrally on the strut members.

For assembly purposes, the tubular housing slit 14 extends parallel with the base plate or with the chock plate, and corresponds in width at least to the thickness of the strut members. For assembly or fitting position, the chock plate and base plate are aligned one behind the other with the slits in the tubular members of chock plate and base plate facing one another. The strut members may now be laterally slidingly inserted with their hinge pins into the tubular housings. After complete insertion the chock plate may be pivoted upwardly and the pivoting of the strut members relative to the slits assures that the hinge pins and with them the struts are securely locked against accidental lateral disengagement from the tubular housings. This is due to the fact that the lateral edges of the strut members engage with the inner edges of the tubular housings.

In order to facilitate unfolding of the wheel chock from its collapsed condition, wherein the base plate and the chock plate extend mutually parallel one on top of the other, into operative or service position, and for generally easier manipulation of the device, the central strut 9 is provided with a grip or handle part 15.

The wheel chock, if applied angularly to the wheel 16, will automatically align itself. The wheel 16 on the one hand encounters the base plate 1, and, on the other hand abuts on one side against the chock plate 2. In this way a force is created which aligns and directs the chock plate 2, and thereby the brake wedge as a whole, in such a manner as to ensure full contact engagement of the vehicle wheel across the width thereof.

It will be understood that this invention is susceptible to modification in order to adapt it to different usages and conditions, and accordingly, it is desired to comprehend such modifications within this invention as may fall within the scope of the appended claims.

What is claimed is:

1. A wheel chock for vehicles comprising a base plate, a wheel supporting chock plate, first and second pivot means on each of said base and chock plates and equally spaced behind each other thereon transversely of the pivot axis, and a plurality of mutually crossing struts pivotally connecting corresponding pivot means on said base and chock plates such that said chock plate is pivotable from an assembled position in the same plane as said base plate to a position above the base plate for engaging the periphery of a vehicle wheel.

2. A wheel chock as claimed in claim 1 wherein said first pivot means on said base plate is closer to the wheel of a vehicle when the chock plate is in the wheel blocking position, said struts comprising a pair of spaced parallel struts interconnecting said second pivot means on said base and chock plates, and a third strut between said pair of struts interconnecting the first pivot means of said plates.

3. A wheel chock as claimed in claim 1 and comprising interengaging means on said struts for mutually supporting each other.

4. A wheel chock as claimed in claim 3 wherein said interengaging means comprises an undulating configuration of the mutually facing edges of said struts over a portion of their length.

5. A wheel chock as claimed in claim 1 wherein said pivot means each comprises a tubular housing having a central longitudinal opening therein over a portion of its axial length, a transversely extending pin on each end of said struts and slidably insertable in said tubular housing, said pin having a length greater than the length of said longitudinal opening and extending beyond both ends of said opening, the width of each of said struts in the region of a pin thereon being substantially equal to the length of said longitudinal opening.

6. A wheel chock as claimed in claim 1 wherein said pivot means each comprises a pair of spaced tubular hinge housings on one of said base or chock plates, and hinge bolts on the ends of said struts at right angles to the longitudinal axis of the respective strut and slidable into said hinge housing.

7. A wheel chock as claimed in claim 5 wherein said tubular housings each has a slit parallel to one of the base or chock plates respectively, said slit having a width substantially equal to the thickness of a strut, said slits being so located on said tubular housing that when said chock and base plates are aligned in the same plane in the assembled position the slits on the chock and base plates face toward each other.

8. A wheel chock as claimed in claim 2 and comprising handle means on said third strut.

9. A wheel chock as claimed in claim 5 wherein said chock plate and said base plate with their respective tubular housings each comprise an integral structural unit, each of said struts with its respective hinge pins comprising a second integral structural unit, each of said units being formed of plastic by injection molding.

* * * * *